J. C. SIMMONS
FOUR WHEEL DRIVE TRACTOR.
APPLICATION FILED FEB. 2, 1917.
1,262,109.
Patented Apr. 9, 1918.
4 SHEETS—SHEET 2.
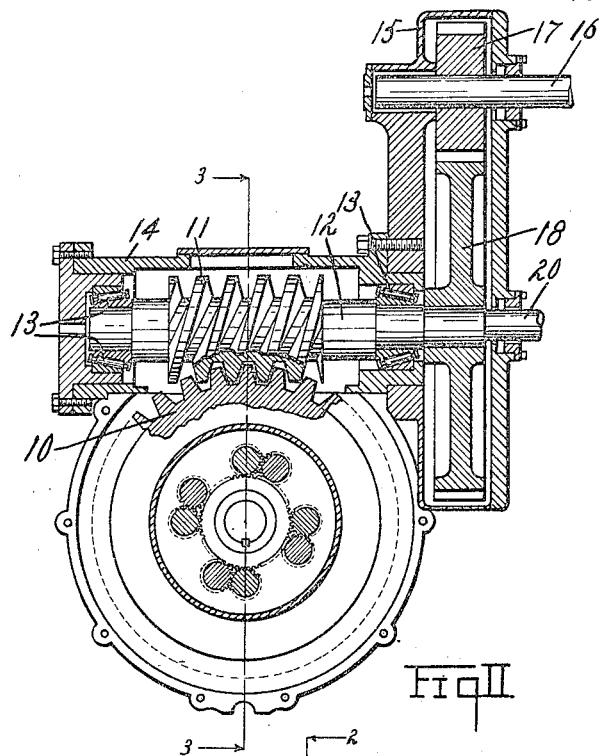
Fig II.
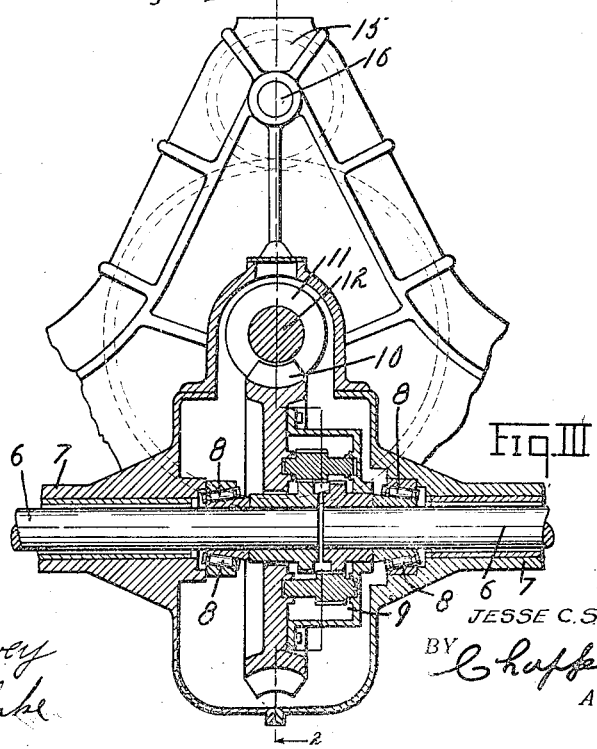
Fig III.
WITNESSES:
Olin Harvey
Luther Blake
INVENTOR.
JESSE C. SIMMONS
BY Chappell Earl
ATTORNEYS.

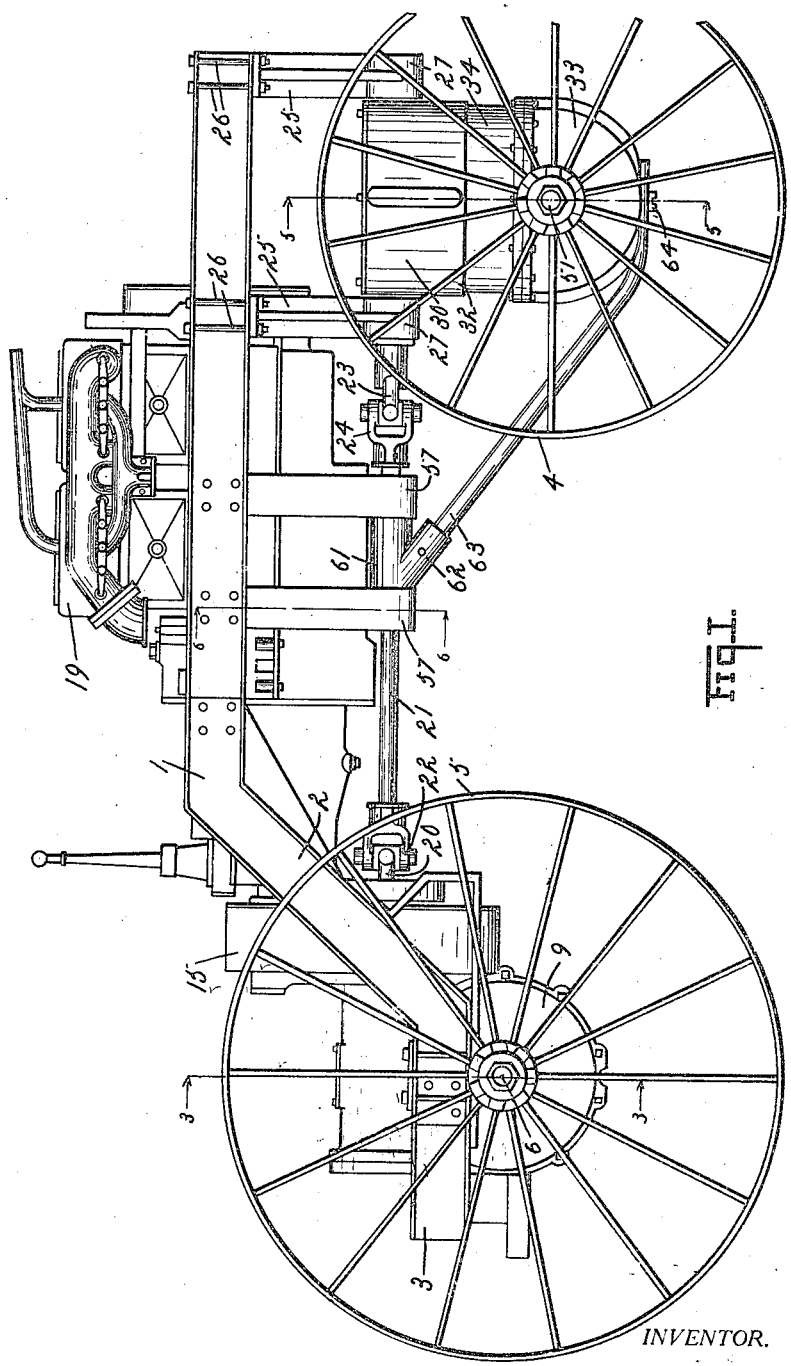

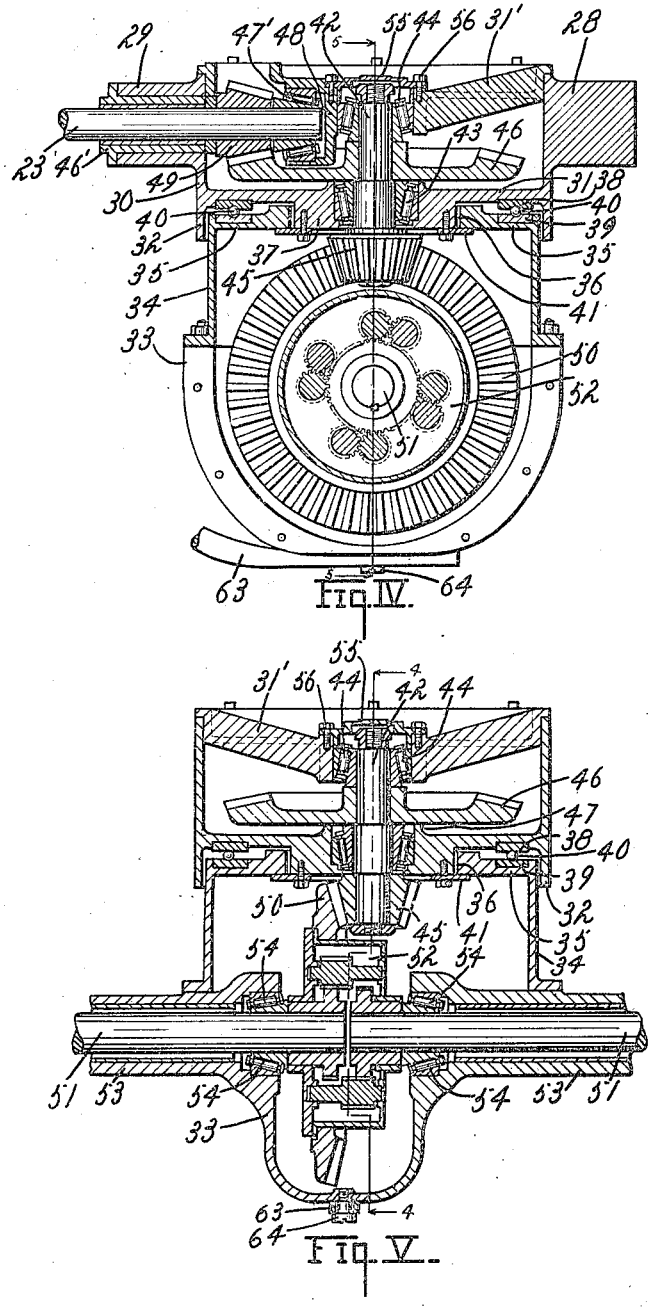

J. C. SIMMONS
FOUR WHEEL DRIVE TRACTOR.
APPLICATION FILED FEB. 2, 1917.
1,262,109.
Patented Apr. 9, 1918.
4 SHEETS—SHEET 4.
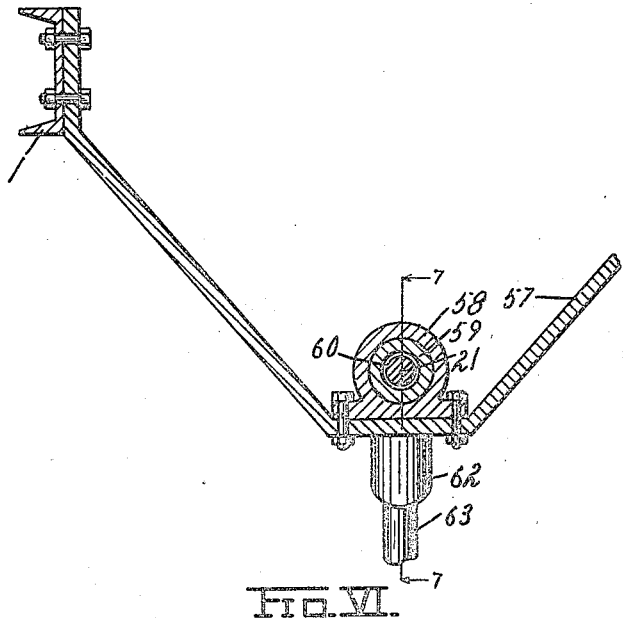
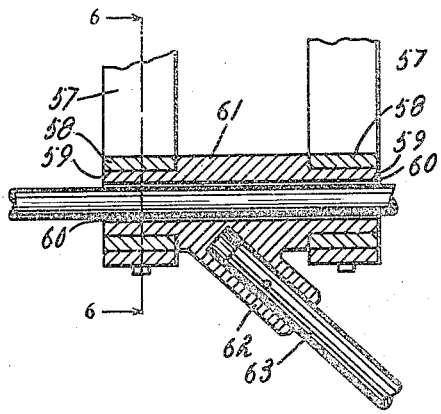
WITNESSES:
Olin Harvey
Luther Blake
INVENTOR.
Jesse C. Simmons.
BY
ATTORNEYS.

UNITED STATES PATENT OFFICE.

JESSE C. SIMMONS, OF BIG RAPIDS, MICHIGAN, ASSIGNOR TO THE FOUR DRIVE TRACTOR CO., OF BIG RAPIDS, MICHIGAN.

FOUR-WHEEL-DRIVE TRACTOR.

1,262,109.      Specification of Letters Patent.      Patented Apr. 9, 1918.

Application filed February 2, 1917. Serial No. 146,084.

*To all whom it may concern:*

Be it known that I, JESSE C. SIMMONS, a citizen of the United States, residing at Big Rapids, Michigan, have invented certain new and useful Improvements in Four-Wheel-Drive Tractors, of which the following is a specification.

This invention relates to improvements in four-wheel drive tractors.
The objects of the invention are to provide a tractor having a three point suspension, the front wheels being so arranged that they may tilt transversely of the tractor frame, and to provide a tractor in which the pull of the front wheels is transmitted to approximately the center portion of the frame of the tractor whereby the stresses on the supporting frame and other parts of the mechanism are more evenly distributed.
Further objects, and objects relating to details and economies of construction and operation will definitely appear from the detailed description to follow.

I accomplish the objects of my invention by the devices and means described in the following specification. The invention is clearly defined and pointed out in the claims.

A structure which is a preferred embodiment of my invention is illustrated in the accompanying drawing forming a part of this specification, in which:

Figure I is a side elevation of my improved tractor.
Fig. II is an enlarged detail vertical longitudinal section on the line 2—2 of Fig. III.

Fig. III is an enlarged detail transverse vertical section on line 3—3 of Figs. I and II.

Fig. IV is an enlarged detail longitudinal vertical section of the front wheel driving mechanism and support, taken on line 4—4 of Fig. V.
Fig. V is an enlarged detail transverse vertical section on line 5—5 of Figs. I and IV.

Fig. VI is an enlarged sectional detail on the line 6—6 of Figs. I and VII.

Fig. VII is an enlarged longitudinal detail sectional view taken on line 7—7 of Fig. VI.

In the drawing similar reference characters refer to similar parts throughout the several views and the sectional views are taken looking in the direction of the little arrows at the ends of the section lines.

In the drawings, the frame is shown as comprising horizontal channel members 1 having the rearwardly inclined portions 2 and the horizontal rear extensions 3. 4 and 5 indicate the front and rear wheels, respectively, the rear wheels being supported and driven by the divided rear driving axle 6.
The driving axle 6 is rotatably supported in the tubular casing 7 by means of taper roller bearings 8. A differential for the rear driving shaft is illustrated at 9 and since the details of this differential form no part of the present invention, the illustration is merely conventional, and further description thereof is therefore believed to be unnecessary.

A worm gear 10, which forms a part of the differential mechanism, is driven by a worm 11 on the rear propeller shaft 12. The rear propeller shaft is provided with tapered bearings 13 supported by a suitable housing 14 mounted on the frame.

15 designates as a whole a suitable multiple speed and reverse transmission, the details of which form no part of the present invention and are not, therefore, illustrated. It is sufficient to state that this transmission rotates the driving shaft 16 (see Figs. II and III) at various speeds and in opposite directions, the transmission being provided with the usual or suitable means of control. The rear end of the shaft 16 is provided with a pinion 17 meshing with the gear 18 secured to the driven shaft, which comprises the rear propeller shaft 20, the intermediate section 21, the front propeller shaft 23 and the universal joints 22 and 24. The driven shaft may be made in one piece by omitting the universal joints. By means of the connections just described, the rear driving axle 6 may be driven at different speeds and in opposite directions as is usual with such axles.

19 indicates as a whole a suitable motor which is here illustrated as consisting of an internal combustion engine.

The front wheels are supported upon the frame by means of V-shaped braces 25, the upper ends of the legs of which are secured to the side frame members by means of bolts 26. These braces are provided with alined bearings 27 which rotatably support the front and rear trunnions 28 and 29, respectively. These trunnions are formed integral with and support the cylindrical gear box 30 having the bottom plate 31 and the cap 31'. The bottom plate 31 is spaced upwardly from the bottom of the gear box 30 so as to provide flanges 32 which extend downwardly about the differential housing 33 which has a cylindrical upper portion 34. At the top of the cylindrical portion 34 is an inwardly extending flange 35 forming an aperture 36 which receives a downwardly extending boss 37 on the bottom plate 30. Opposed annular ball races 38 and 39 are secured in the bottom plate 31 and the flange 35, respectively, bearing balls 40 being interposed between these races. An annular plate 41 is bolted to the boss 37 and extends outwardly beyond the inner edge of the flange 35 to prevent excessive longitudinal movement of the differential case relative to the gear box 30.

A vertical shaft 42 is mounted in tapered roller bearings 43 and 44 secured in alined central apertures in the bottom plate 31 and cap 31', respectively. A bevel pinion 45 is secured to the lower end of the shaft 42 and the bevel gear 46 is secured to the upper end of the shaft 42 and rests upon the annular boss 47 on the bottom plate 31.

The front end of the front propeller shaft 23 extends through a suitable bearing 46' supported in the hollow trunnion 29 and is provided at its extreme end with a tapered roller bearing 47'. The bearing 47' is supported from the cap 31' by a bracket 48.

Secured to the shaft 23 between the bearings 46' and 47' is a bevel pinion 49 meshing with a bevel gear 46. The bevel pinion 45 on the lower end of the shaft 42 meshes with the bevel gear 50. The bevel gear 50 drives the front driving axle 51 through a differential 52 which is merely conventionally illustrated because the details thereof form no part of the present invention. The driving axle 51 is suitably housed in the axle housing 53 and supported by the combined roller and thrust bearings 54. A cover plate 55 is secured to the cap 31' above the end of the spindle by means of screws 56.

The connections just recited provide means whereby the front wheels may be driven and may be steered by turning the differential housing 33 relative to the gear casing 30. The steering mechanism is not illustrated for the reason that the details thereof form no part of this invention and any suitable steering mechanism may be employed whereby the differential housing 33 can be turned relative to the gear casing 30.

Two braces 57 similar to the braces 25 depend from the frame and support bearings 58. A sleeve 59 is rotatably mounted in the bearing 58 and has a bore 60 therethrough, through which the intermediate section 21 passes, the bore being appreciably larger than the shaft in order to allow limited transverse movement of the latter. The sleeve 59 is provided with an annular boss 61 which engages the inner ends of the bearings 58. A cylindrical boss 62 extends downwardly and rearwardly from the sleeve 59 and supports one end of the brace 63, the opposite end of this brace being pivotally secured to the bottom of the differential housing by means of a pivot screw 64.

In operation, the pull developed by the front wheels is transmitted by the brace 63 to the boss 62 and from the boss 62 through the sleeve 59 and brace 57 to the frame. The trunnions 28 and 29 provide longitudinal pivot or swivel means for the front wheels whereby either of the front wheels may be elevated when it encounters an obstruction without materially affecting the remaining portions of the tractor and reducing the transverse stress upon the tractor frame, and since the sleeve 59 is rotatably mounted in alinement with the trunnions 28 and 29, the brace 63 offers no resistance to the lateral movement of the front wheels.

Having thus described my invention, what I claim as new and desire to secure by Letters Patent is:

1. In a structure of the class described, the combination of a frame, a motor mounted thereon, front and rear driving axles, traction wheels mounted on said driving axles, a driven shaft extending longitudinally of said frame, driving connections connecting said motor and said driven shaft, a differential connecting the rear end of said driven shaft with the rear driving axle, a support for said front driving axle comprising a gear box, opposed trunnions for pivotally mounting said gear box longitudinally of said frame, bearings for said trunnions supported on said frame, a differential housing having a vertical pivotal connection with said gear box, a differential in said differential housing for driving said front driving axle, means in said gear box for connecting the front end of said driven shaft with said last named differential, and means for transmitting the pull of said front traction wheels to said frame comprising a sleeve, means for rotatably supporting said sleeve, a brace connected to said sleeve, and a vertical pivot connecting said brace with said differential housing.

2. A tractor comprising a frame, a motor mounted thereon, front and rear driving axles, traction wheels mounted on said driving axles, a driven shaft extending longitudinally of said frame, driving connections between said motor and said driven shaft, a driving connection between said rear driving axle and the rear end of said driven shaft, a support for said front driving shaft comprising a gear box swiveled longitudinally of said frame, a differential housing having bearings for said front driving axle and a vertical pivotal connection with said gear box, a differential in said differential housing for driving said front driving axle, and gears in said gear box connecting the front end of said driven shaft with said differential.

3. In a structure of the class described, the combination of a frame, front and rear driving axles, traction wheels mounted on said driving axles, a motor, a driven shaft extending longitudinally of said frame, driving connections between said motor and said driven shaft comprising a transmission, a support for said front driving axle comprising a member having front and rear trunnions for pivotally mounting it longitudinally of said frame, said rear trunnion being hollow and having a bearing for the front end of said driven shaft, a second member having bearings for said front driving axle, a vertical pivotal connection between said first member and said second member, driving connections between the front end of said driven shaft and said front driving shaft comprising a differential, and means for transmitting the pull of said front traction wheels to the central portion of said frame comprising a sleeve member surrounding said driven shaft, means for rotatably supporting said sleeve member, a brace having one end connected to said sleeve member, and means for pivotally connecting the other end of said brace to said second member.

4. In a structure of the class described, the combination of a frame, front and rear driving axles, traction wheels mounted on said driving axles, a motor, a driven shaft, driving connections between said motor and said driven shaft, a support for said front driving axle comprising a member having means for pivotally mounting it longitudinally of said frame, a second member having bearings for said front driving axle, a vertical pivotal connection between said first member and said second member, driving connections between the front end of said driven shaft and said front driving axle, and means for transmitting the pull of said front traction wheels to the central portion of said frame comprising a sleeve member surrounding said driven shaft, means for rotatably supporting said sleeve member, a brace having one end connected to said sleeve member, and means for pivotally connecting the other end of said brace to said second member.

5. In a structure of the class described, the combination of a frame, front and rear driving axles, traction wheels mounted on said driving axles, a motor, a driven shaft, driving connections between said motor and said driven shaft, a support for said front driving axle comprising a member having means for pivotally mounting it longitudinally of said frame, a second member having bearings for said front driving axle, a vertical pivotal connection between said first member and said second member and driving connections between the front end of said driven shaft and said front driving axle.

6. In a structure of the class described, the combination of a frame, a motor mounted thereon, a driven shaft extending longitudinally of said frame, driving connections between said motor and said driven shaft comprising a transmission, a front driving axle, traction wheels thereon, means for supporting said front driving axle comprising a member having opposed trunnions, longitudinally alined bearings for said trunnions, a second member having bearings for said front driving axle, a vertical pivotal connection between said first member and said second member, driving connections between said driven shaft and said front driving axle comprising a differential, and means for transmitting the pull of said front traction wheel to said frame comprising a sleeve member, longitudinally alined bearings for rotatably supporting said sleeve member, and a brace connecting said sleeve and said front driving axle support having a vertical pivotal connection with said front driving axle support.

7. In a structure of the class described, the combination of a frame, a motor mounted thereon, a driven shaft extending longitudinally of said frame, driving connections between said motor and said driven shaft, a front driving axle, traction wheels thereon, means for supporting said front driving axle comprising a member swiveled longitudinally of said frame, a second member having bearings for said front driving axle, a vertical pivotal connection between said first member and said second member, driving connections between said driven shaft and said front driving axle, and means for transmitting the pull of said front traction wheel to said frame comprising a supporting member, longitudinally alined bearings for said supporting member, and a brace connecting said supporting member and said front driving axle support having a vertical pivotal connection with said front driving axle support.

8. In a structure of the class described, the combination of a frame, a front driving axle, traction wheels thereon, means for supporting said front driving axle comprising a member swiveled longitudinally of said frame, a second member having bearings for said front driving axle, a vertical pivotal connection between said first member and said second member, driving connections between said driven shaft and said front driving axle comprising a differential, and means for transmitting the pull of said front traction wheel to said frame comprising a sleeve member, longitudinally alined bearings for rotatably supporting said sleeve member, and a brace connecting said sleeve and said front driving axle support having a vertical pivotal connection with said front driving axle support.

9. In a structure of the class described, the combination of a supporting frame, a motor mounted thereon, a multiple speed and reverse transmission driven by said motor, a rear propeller shaft, a rear driving axle mounted on said frame, a differential connecting said rear propeller shaft to said rear driving axle, driving connections between said transmission and said rear propeller shaft, a front driving axle, an axle housing therefor, a differential housing, a pivoted gear casing on a vertical axis above said differential housing and pivotally supported thereon, oppositely extending trunnions on said gear case, longitudinally alined bearings for said trunnions supported on said frame, a front propeller shaft extending through one of said trunnions, driving connections between said front propeller shaft and said front driving axle, comprising a differential, an intermediate section connecting said front and rear propeller shafts, a sleeve surrounding said intermediate section, means for rotatably supporting said sleeve, and a forwardly and downwardly extending brace rigidly connected to said sleeve and connected to said wheel support by a vertical pivot.

In witness whereof, I have hereunto set my hand and seal in the presence of two witnesses.

JESSE C. SIMMONS. [L. S.]

Witnesses:
  FRED A. ASHLEY,
  ALMA A. JOHNSON.